(12) United States Patent
Matsuoka et al.

(10) Patent No.: US 8,263,303 B2
(45) Date of Patent: Sep. 11, 2012

(54) METHOD FOR PRODUCING COLORED RESIN PARTICLE DISPERSION LIQUID, COLORED RESIN PARTICLE DISPERSION LIQUID, AND ELECTROPHOTOGRAPHIC LIQUID DEVELOPER

(75) Inventors: Hirotaka Matsuoka, Kanagawa (JP); Yuki Sasaki, Kanagawa (JP); Satoshi Hiraoka, Kanagawa (JP); Fumiaki Mera, Kanagawa (JP); Yasuo Matsumura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1146 days.

(21) Appl. No.: 11/501,876

(22) Filed: Aug. 10, 2006

(65) Prior Publication Data
US 2007/0197734 A1 Aug. 23, 2007

(30) Foreign Application Priority Data
Feb. 17, 2006 (JP) .................. 2006-040498

(51) Int. Cl.
G03G 13/10 (2006.01)
G03G 13/01 (2006.01)
G03G 5/00 (2006.01)
C08G 63/48 (2006.01)

(52) U.S. Cl. .............. 430/119.2; 430/45.55; 430/118.8; 430/137.16; 525/39; 525/40; 525/49

(58) Field of Classification Search .................. 525/242, 525/39, 40, 49; 524/506; 523/106; 430/45.55, 430/118.8, 119.2, 137.16
See application file for complete search history.

(56) References Cited

U.S. PATENT DOCUMENTS

| 4,187,383 | A | * | 2/1980 | Cowherd et al. ............. 560/224 |
|---|---|---|---|---|
| 4,931,370 | A | * | 6/1990 | Amaya et al. ............. 430/109.3 |
| 5,017,450 | A | * | 5/1991 | Iwanari et al. ........... 430/109.31 |
| 5,229,235 | A | * | 7/1993 | Watanabe et al. ............ 430/45.2 |
| 5,856,401 | A | * | 1/1999 | Saam ............................. 524/800 |
| 6,143,806 | A | * | 11/2000 | Kato et al. ..................... 523/160 |
| 6,420,516 | B1 | | 7/2002 | Tau et al. |
| 6,936,657 | B2 | * | 8/2005 | Takao et al. ................... 524/588 |
| 7,090,951 | B2 | | 8/2006 | Matsunaga et al. |
| 7,129,013 | B2 | | 10/2006 | Higuchi et al. |
| 7,291,659 | B2 | | 11/2007 | Tsuru et al. |
| 7,514,193 | B2 | | 4/2009 | Nagahama et al. |
| 2004/0115549 | A1 | * | 6/2004 | Ishii et al. ................ 430/108.23 |
| 2005/0221214 | A1 | | 10/2005 | Nagahama et al. |
| 2006/0008723 | A1 | * | 1/2006 | Fujikawa et al. .......... 430/108.6 |
| 2006/0030640 | A1 | | 2/2006 | Tsuru et al. |
| 2006/0030670 | A1 | * | 2/2006 | Lee et al. ...................... 525/242 |

FOREIGN PATENT DOCUMENTS

| CN | 1283204 A | 2/2001 |
|---|---|---|
| CN | 1497365 A | 5/2004 |
| CN | 1521571 A | 8/2004 |
| CN | 1677253 A | 10/2005 |
| CN | 1730575 A | 2/2006 |
| JP | A 3-263053 | 11/1991 |
| JP | A 3-263054 | 11/1991 |
| JP | A 3-271752 | 12/1991 |
| JP | A 3-274065 | 12/1991 |
| JP | A 3-274066 | 12/1991 |

* cited by examiner

Primary Examiner — David W Wu
Assistant Examiner — Elizabeth Eng
(74) Attorney, Agent, or Firm — Oliff & Berridge, PLC

(57) ABSTRACT

A method for producing a colored resin particle dispersion liquid comprises: polycondensing a polyester-forming monomer in a nonaqueous solvent to produce an unsaturated polyester; graft-polymerizing an ethylenic unsaturated monomer to the unsaturated polyester in a nonaqueous solvent to produce a modified polyester resin; and dispersing a colorant and the modified polyester resin to produce a colored resin particle dispersion liquid, the polycondensing and the graft-polymerizing being carried out at a temperature of 150° C. or less.

15 Claims, No Drawings

METHOD FOR PRODUCING COLORED RESIN PARTICLE DISPERSION LIQUID, COLORED RESIN PARTICLE DISPERSION LIQUID, AND ELECTROPHOTOGRAPHIC LIQUID DEVELOPER

BACKGROUND (i) Technical Field

The present invention relates to a nonaqueous colored resin particle dispersion liquid and an ink that are suitable for a liquid toner for developing an electrostatic image, which is used for developing an electrostatic latent image formed by an electrophotographic process or an electrostatic recording process with a liquid developer, a method for producing them, and a method for producing a colored resin particle dispersion liquid capable of being used as a raw material therefor. The invention also relates to a developer for developing an electrostatic image containing the toner for developing an electrostatic image, and a method for forming an image.

(ii) Related Art

The method of developing an electrostatic latent image in the electrophotographic process is roughly classified into a dry developing method and a wet developing method. The dry developing method is performed by applying and adhering a colorant in a powder form to an electrostatic latent image, and has advantages including excellent handleability and storage stability of the toner. In recent years, a high quality image having a high resolution is demanded in such a purpose as a video printer, and the particle diameter of the developer should be decreased for obtaining an image having a high resolution. However, the dry developing method has such problems as aggregation of the toner, broadening of the charge amount distribution, and deterioration in cleaning property, with the decreased in particle diameter, and thus has limitation in dealing with an image having a high resolution.

The wet developing method uses a liquid developer containing a dye or a pigment as a colorant dispersed in an insulating medium and can provide an image having a high resolution and a high gradient since it contains colored particles having a smaller particle diameter than the dry developing method. Accordingly, various investigations and developments for a liquid developer have been made in recent years.

SUMMARY

The invention is to provide such a method for producing a colored resin particle dispersion liquid that is small in energy for production and has high storage stability. The invention is also to provide a colored resin particle dispersion liquid having high storage stability capable of being suitably used as a liquid developer and an ink composition, and to provide a liquid developer, an ink composition and a coating composition containing the same.

The invention includes the following aspect.

1. A method for producing a colored resin particle dispersion liquid containing steps of: polycondensing a polyester-forming monomer in a nonaqueous solvent to produce an unsaturated polyester; graft-polymerizing an ethylenic unsaturated monomer to the unsaturated polyester in a nonaqueous solvent to produce a modified polyester; and dispersing a colorant and the modified polyester to produce a colored resin particle dispersion liquid, the polycondensing step and the graft-polymerizing step being carried out at a temperature of 150° C. or less.

DETAILED DESCRIPTION

The invention will be described below in detail.

According to an aspect of the invention, the method for producing a colored resin particle dispersion liquid contains steps of: polycondensing a polyester-forming monomer in a nonaqueous solvent to produce an unsaturated polyester; graft-polymerizing an ethylenic unsaturated monomer to the unsaturated polyester in a nonaqueous solvent to produce a modified polyester; and dispersing a colorant and the modified polyester to produce a colored resin particle dispersion liquid, in which the polycondensing step and the graft-polymerizing step are carried out at a temperature of 150° C. or less.

The graft polymer used in the invention is produced through two steps. For example, at least a polybasic acid containing an unsaturated aliphatic dibasic acid and a polyhydric alcohol are polycondensed in a nonaqueous solvent to produce an unsaturated polyester, and subsequently, an aromatic vinyl monomer and a vinyl monomer containing an acid and/or a base are graft-polymerized in a prescribed amount in the presence of the unsaturated polyester in a nonaqueous solvent to produce a vinyl-modified polyester.

The nonaqueous solvent used in the polycondensation for obtaining the unsaturated polyester and the modification of the polyester is an organic solvent excluding water, and is preferably a non-reactive organic solvent. Examples of the nonaqueous solvent include an aliphatic hydrocarbon, such as hexane and mineral spirit; an alicyclic hydrocarbon, such as cyclohexane; an aromatic hydrocarbon, such as benzene, toluene and xylene; a halogenated hydrocarbon ethylene dichloride; a silicone oil, such as dialkylpolysiloxane and cyclic polydialkylsiloxane; a vegetable oil, such as olive oil, safflower oil, sunflower oil, soybean oil and linseed oil; and an ester solvent, such as butyl acetate. Among these, an aliphatic hydrocarbon, an alicyclic hydrocarbon, an aromatic hydrocarbon, a halogenated hydrocarbon and a polysiloxane compound are preferred, and an isoparaffin petroleum solvent is preferred from the standpoint of volatility, toxicity and odor. Examples of the isoparaffin petroleum solvent include Isopar M, Isopar G, Isopar H, Isopar L and Isopar K (all produced by Exxon Chemical Corp.) and Shellsol 71 (produced by Shell Oil Co.). It is preferred that an isoparaffin petroleum solvent is used as a reaction solvent for the polycondensation and the ester modification and is also used as a dispersion solvent for the colored resin particles.

A vinyl-modified polyester resin, which is obtained by graft-polymerizing an aromatic vinyl monomer and a vinyl monomer containing an acid and/or a base are graft-polymerized in a prescribed amount to an unsaturated polyester having a large number of a hydrophilic group, such as a carboxyl group and a hydroxyl group, has a lower content of a hydrophilic group than the unsaturated polyester resin before graft polymerization to have a larger mutual reaction with the pigment. As a result, the vinyl-modified polyester resin is improved in stability on dispersion of various kinds of pigments with good full color reproducibility, OHP transparency and a suitable fixing strength maintained, which are characteristic features of the vinyl-modified polyester resin.

The polar group-containing vinyl monomer is preferably used for obtaining stable dispersion of the colorant. In the case where the content of the addition-polymerizable ethylenic unsaturated monomer, such as the polar group-containing vinyl monomer, is from 0.1 to 20.0% by weight based on the unsaturated polyester resin, the dispersion property to the colorant of the vinyl resin is added to the strength of the fixed image of the polyester to provide such an advantage that good fixing property and dispersion property can be obtained of the toner in total.

One example of the binder resin that is preferably used in the invention is a modified polyester resin having a weight average molecular weight of from 1,500 to 40,000 and a melt viscosity at 100° C. of from $10^3$ to $10^6$ poise, which is obtained by graft-polymerizing (2) from 70 to 10 parts by weight of a vinyl monomer mixture containing 50% by weight of more of an aromatic vinyl monomer and from 1 to 30% by weight of a vinyl monomer containing an acidic group or a basic group to (1) from 30 to 90 parts by weight of an unsaturated polyester resin having a weight average molecular weight of from 1,500 to 12,000, which is obtained with a polyhydric acid mixture containing an aliphatic unsaturated dibasic acid in an amount of from 0.1 to 5% by weight, and preferably from 0.2 to 2.0% by weight, in the polyester resin, through polycondensation of such a polycondensation monomer mixture that provides a number of an aromatic ring or an alicyclic ring per unit of from 2.0 or more.

In the case where the weight average molecular weight of the graft polymer as the vinyl-modified polyester exceeds 1,500, the binder resin has a favorable cohesion force and excellent hot offset property, and in the case where it is 40,000 or less, the graft polymer has excellent hot offset property and excellent minimum fixing temperature. The graft polymer may have branches or crosslinking in part depending on the valency of the polybasic acid and the valency of the alcohol component constituting the polycondensation monomers.

The unsaturated polyester obtained by polycondensing the polycondensation monomers preferably has a weight average molecular weight of from 1,500 to 12,000, and more preferably from 3,000 to 12,000. In the case where the weight average molecular weight is in the range, gelation can be prevented from occurring upon graft polymerization to provide a favorable graft polymer. The aliphatic unsaturated dibasic acid in the constitutional components of the polyester resin is an important component since it functions as a graft active site and introduces a partial crosslinked structure into the graft polymer. In the case where the content of the aliphatic unsaturated dibasic acid is in a range of from 0.2 to 2.0% by weight based on the polyester, the graft polymerization can be carried out while preventing gelation from occurring.

The aliphatic unsaturated dibasic acid used on polycondensing to provide the unsaturated polyester preferably contains an ethylenic unsaturated group having 4 or 5 carbon atoms, and examples thereof include maleic acid, maleic anhydride, fumaric acid, itaconic acid and citraconic acid. Preferred examples of the aliphatic unsaturated dibasic acid include maleic acid and maleic anhydride.

Other examples of the polybasic acid include a dibasic acid, such as phthalic acid, phthalic anhydride, isophthalic acid, orthophthalic acid, hexahydrophthalic anhydride, tetrahydrophthalic anhydride, cyclohexanedicarboxylic acid, succinic acid, malonic acid, glutaric acid, adipic acid, azelaic acid, sebacic acid and an alkyl or alkenylsuccinic acid having from 4 to 18 carbon atoms.

Examples of the polycondensation monomer providing a number of an aromatic ring or an alicyclic ring per unit of from 2.0 or more include a polybasic carboxylic acid, a polyol, a hydroxycarboxylic acid, and mixtures thereof. Preferred examples of the polycondensation monomer include a polybasic carboxylic acid, a polyol, and esterified products thereof (an oligomer and/or a prepolymer), and more preferably those providing the polyester through a direct esterification reaction or an ester exchange reaction. In this case, the polyester resin thus polymerized may be an amorphous polyester (a noncrystalline polyester), a crystalline polyester, or a mixed form thereof.

The saturated polybasic carboxylic acid includes a compound having two or more carboxylic groups in one molecule. Among the compounds, a dicarboxylic acid is a compound having two carboxyl groups in one molecule, and examples thereof include oxalic acid, succinic acid, adipic acid, β-methyladipic acid, azelaic acid, sebacic acid, nonanedicarboxylic acid, decanedicarboxylic acid, undecanedicarboxylic acid, dedecanedicarboxylic acid, diglycollic acid, cyclohexan-3,5-diene-1,2-dicarboxylic acid, malic acid, citric acid, hexahydroterephthalic acid, malonic acid, pimelic acid, tartaric acid, mucic acid, phthalic acid, isophthalic acid, terephthalic acid, tetrachlorophthalic acid, chlorophthalic acid, nitrophthalic acid, p-carboxyphenylacetic acid, p-phenylenediacetic acid, m-phenylenediacetic acid, o-phenylenediacetic acid, diphenyldiacetic acid, diphenyl-p, p'-dicarboxylic acid, naphthalene-1,4-dicarboxylic acid, naphthalene-1,5-dicarboxylic acid, naphthalene-2,6-dicarboyxlic acid and anthracene dicarboxylic acid.

Examples of the polybasic carboxylic acid other than a dicarboxylic acid include trimellitic acid, pyromellitic acid, naphthalenetricarboxylic acid, naphthalenetetracarboxylic acid, pyrenetricarboxylic, acidpyrenetetracarboxylic acid, and a lower alkyl ester thereof. Acid chlorides thereof are also included. These acids and the like may be used solely or in combination of two or more of them. The lower alkyl ester referred therein includes an ester having an alkoxy part having from 1 to 8 carbon atoms, and specific examples thereof include a methyl ester, an ethyl ester, a n-propyl ester, an isopropyl ester, a n-butyl ester and an isobutyl ester.

The polyol is a compound having two or more hydroxyl groups in one molecule. Among the compounds, a diol is a compound having two hydroxyl groups in one molecule, examples of which include ethylene glycol, propylene glycol, butanediol, diethylene glycol, hexanediol, cyclohexanediol, octanediol, decanediol and dodecanediol. Examples of the polyol other than a diol include glycerin, pentaerythritol, hexamethylamelamine, hexaethylolmelamine, tetramethylolbenzoguanamine and tetraethylolbenzoguanamine. These compounds may be used solely or in combination of two or more of them.

An amorphous resin and a crystalline resin can be easily obtained with a combination of these polycondensation monomers.

For example, examples of the saturated polybasic carboxylic acid for obtaining the crystalline polyester include oxalic acid, malonic acid, succinic acid, glutaric acid, adipic acid, pimelic acid, suberic acid, azelaic acid, sebacic acid, glutaconic acid, n-doedecylsuccinic acid, n-dedecenylsuccinic acid, isododecylsuccinic acid, isododecenylsuccinic acid, n-octylsuccinic acid, n-octenylsuccinic acid, and an acid anhydride or a lower ester thereof. Acid chlorides thereof are also included, but the invention is not limited to these compounds.

Examples of polyol for obtaining the crystalline polyester include ethylene glycol, diethylene glycol, triethylene glycol, 1,2-propylene glycol, 1,3-propylene glycol, 1,4-butanediol, 1,4-butenediol, neopentyl glycol, 1,5-pentane glycol, 1,6-hexane glycol, 1,4-cyclohexanediol, 1,4-cyclohexanedimethanol, dipropylene glycol, polyethylene glycol, polypropylene glycol, polytetramethylene glycol, bisphenol A, bisphenol Z and hydrogenated bisphenol A.

Examples of the polybasic carboxylic acid for obtaining the amorphous polyester include an aromatic dicarboxylic acid, such as phthalic acid, isophthalic acid, terephthalic acid, naphthalene-2,6-dicarboxylic acid, malonic acid and mesaconic acid, and a lower ester thereof is also used, but the invention is not limited to these compounds. Examples of the tribasic or higher basic carboxylic acid include 1,2,4-benzenetricarboxylic acid, 1,3,5-benzenetircarboxylic acid, 1,2,4-naphthalenetricarboxylic acid, and an anhydride thereof, sodium 2-sulfoterephtalate, sodium 5-sulfoisophthalate, sodium sulfosuccunate, and a lower ester thereof, but the invention is not limited to these compounds.

Examples of a saturated polymerization unit in the crystalline polyester include polyester obtained by reacting 1,9-nonanediol with 1,10-decanedicarboxylic acid, or reacting cyclohexanediol with adipic acid, polyester obtained by reacting 1,6-hexanediol with sebacic acid, polyester obtained by reacting ethylene glycol with succinic acid, polyester obtained by reacting ethylene glycol with sebacic acid, and polyester obtained by reacting 1,4-butanediol with succinic acid. Among these, polyester obtained by reacting 1,9-nonanediol with 1,10-decanedicarboxylic acid and polyester obtained by reacting 1,6-hexanediol with sebacic acid are more preferred, but the invention is not limited to these compounds.

In the production method of the invention, the unsaturated polyester as an intermediate product preferably contains the following unit A as a polymerization unit in an amount of 98% by weight or more based on the total amount of the repeating units in the resin.

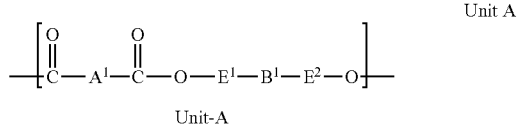

Unit-A

In the unit A, $A^1$ represents a group obtained by removing two hydrogen atoms from an alkane having from 1 to 20 carbon atoms, an aromatic hydrocarbon having from 6 to 20 carbon atoms or a hydrocarbon ring having from 3 to 20 carbon atoms, or a group obtained by combining two or more groups each obtained by removing two hydrogen atoms from an alkane having from 1 to 20 carbon atoms, an aromatic hydrocarbon having from 6 to 20 carbon atoms or a hydrocarbon ring having from 3 to 20 carbon atoms; $B^1$ represents a group obtained by removing two hydroxyl groups from a bisphenol compound; and $E^1$ and $E^2$ each independently represents a single bond, an alkyleneoxide group, a group obtained by two or more alkylene oxide groups.

In the production method of the invention, the unsaturated polyester as an intermediate product preferably contains the following unit B as a polymerization unit in an amount of from 0.2 to 2% by weight or more based on the total amount of the repeating units in the resin.

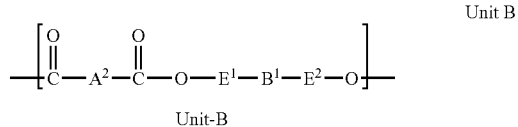

Unit-B

In the unit B, $A^2$ represents a group having from 2 to 16 carbon atoms containing an ethylenic unsaturated group, and preferably the same group containing 2 or 3 carbon atoms; $B^1$, $E^1$ and $E^2$ have the same meanings as in the unit A.

In the case where the unsaturated polyester as an intermediate product is a crystalline resin, the crystalline melting point thereof Tm is preferably from 50 to 120° C., and more preferably from 55 to 90° C. In the case where the crystalline melting point Tm is 50° C. or more, the releasing property and the hot offset property upon fixing are excellent owing to the good cohesion force of the binder resin itself in a high temperature range, and in the case where it is 120° C. or less, it is preferred since sufficient melting is obtained to suppress the minimum fixing temperature from being increased.

The melting point of the crystalline resin herein is measured with a differential scanning calorimeter (DSC) and can be obtained as a melting peak temperature in the input compensation differential scanning calorimetry defined in JIS K7121 upon measuring at a temperature increasing rate of 10° C. per minute from room temperature to 150° C. A crystalline resin may exhibits plural melting peaks in some cases, and in the invention, the maximum peak is designated as the melting point.

In the case where the unsaturated polyester as an intermediate product is an amorphous resin, the glass transition point thereof is a value measured by the method defined in ASTM D3418-82 (DSC method).

In the case where the polyester is amorphous, the glass transition point Tg is preferably from 50 to 80° C., and more preferably from 50 to 65° C. In the case where the glass transition point Tg is 50° C. or more, the hot offset property upon fixing is excellent owing to the good cohesion force of the binder resin itself in a high temperature range, and in the case where it is 80° C. or less, it is preferred since sufficient melting is obtained to suppress the minimum fixing temperature from being increased.

Preferred examples of the polyhydric alcohol for obtaining the amorphous polyester include aliphatic, alicyclic and aromatic alcohols, such as 1,5-pentane glycol, 1,6-hexane glycol, 1,4-cyclohexanediol, 1,4-cyclohexanedimethanol, dipropylene glycol, polyethylene glycol, polypropylene glycol, polytetramethylene glycol, bisphenol A, bisphenol Z and hydrogenated bisphenol A, and also include an alkylene oxide adduct of bisphenol A preferably having an addition molar number of from 2 to 4), but the invention is not limited to these compounds.

Examples of the hydroxycarboxylic acid include hydroxyheptanoic acid, hydroxyoctanoic acid, hydroxydecanoic acid and hydroxyundecanoic acid.

In addition to the aforementioned components, a trifunctional compound, such as trimellitic anhydride, glycerin and trimethylolpropane, may be used in combination in such an amount that causes no gelation of the polyester resin. As a molecular weight controlling agent for the polyester resin, a monofunctional compound, such as benzoic acid, p-tert-butylbenzoic acid and cyclohexanol, may be used.

The polyester resin can be preferably produced by polycondensation of the dicarboxylic acid component and the diol component in an inert gas atmosphere at a temperature of from 50 to 150° C. Upon production, an esterification catalyst that is ordinarily used, such as an acid catalyst, zinc oxide, stannous oxide, dibutyltin oxide and dibutyltin laurate, may be used for accelerating the reaction, and a Brønsted acid and a Brønsted acid having a surfactant function are preferably used.

In order to polycondense the polycondensation monomers at a low temperature of 150° or less, preferably 100° C. or less, and more preferably from 70 to 100° C., a polycondensation catalyst is generally used, and a polycondensation catalyst that has a catalytic activity at a low temperature may also be preferably used, examples of which include an acidic catalyst, a rare earth element-containing catalyst and a hydrolyzing enzyme.

The acidic catalyst is preferably a Brønsted acid, specific examples of which include a sulfonic acid compound, such as toluenesulfonic acid, benzenesulfonic acid and camphor sulfonic acid, and a metallic acid thereof, such as a sodium salt.

An acid having a surfactant function may also be used. The acid having a surfactant function has a chemical structure containing a hydrophobic group and a hydrophilic group, and at least a part of the hydrophilic group having a proton.

Examples of the acid having a surfactant function include an alkylbenzenesulfonic acid, such as dodecylbenzenesulfonic acid, isopropylbenzenesulfonic acid and camphor sulfonic acid, an alkylsulfonic acid, an alkyldisulfonic acid, an alkylphenolsulfonic acid, an alkylnaphthalenesulfonic acid, an alkyltetralinsulfonic acid, an alkylallylsulfonic acid, a petroleum sulfonic acid, an alkylnenzimidazolesulfonic acid, a higher alcohol ether sulfonic acid, an alkyldiphenylsulfonic acid, monobutylphenol sulfate, dibutylphenol sulfate, a higher aliphatic sulfate, such as dodecyl sulfate, a higher alcohol sulfate, a higher alcohol ether sulfate, a higher aliphatic amide alkylol sulfate; a high aliphatic amide alkyl sulfate, naphthenyl alcohol sulfate, a sulfated fat, a sulfosuccinate, various kinds of fatty acids, a sulfonated higher fatty acid, a higher alkyl phosphate, a resin acid, a resin acid alcohol sulfate, naphthenic acid, p-toluenesulfonic acid, and metallic salt compounds of these compounds (including alkali metal salts), which may be used in combination depending on necessity.

Effective examples of the rare earth element-containing catalyst include those containing such an element as scandium (Sc), yttrium (Y), a lanthanoid element, such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb) and lutetium (Lu), and those having an alkylbenzenesulfonate salt, an alkylsufate ester salt or a triflate structure are particularly effective.

The rare earth element-containing catalyst is preferably those having a triflate structure, such as scandiumtriflate, yttriumtriflate and a lanthanoidtriflate. The lanthanoid triflate is described in detail in *J. Syn. Org. Chem., Japan*, vol. 53, No. 5, pp. 44-54 (1995). Examples of the triflate include $X(OSO_2CF_3)_3$ in terms of structural formula, wherein X represents a rare earth element, and more preferably scandium (Sc), yttrium (Y), ytterbium (Yb) or samarium (Sm).

The hydrolyzing enzyme to be used in combination is not particularly limited as far as it has a catalytic action on an ester synthesis reaction. Examples of the hydrolyzing enzyme include an esterase classified into EC 3.1 group (see Maruo and Tamiya, *Koso Handbook* (Enzyme Handbook), published by Asakura Shoten Co., Ltd. (1982)), such as carboxyesterase, lipase, phospholipase, acetylesterase, pectinesterase, cholesteroleaterase, tannase, monoacylglycerollipase, lactonase and lipoproteinlipase, a hydrolyzing enzyme classified into EC 3.2 group acting on a glycosyl compound, such as glucosidase, galactosidase, glucuronidase and xylosidase, a hydrolyzing enzyme classified into EC 3.3 group, such as epoxyhydrase, a hydrolyzing enzyme classified into EC 3.4 group acting on a peptide bond, such as aminopeptidase, chymotrypsin, trypsin, plasmin and subtilisin, and a hydrolyzing enzyme classified into EC 3.7 group, such as phloretinhydrase.

An esterase that hydrolyzes a glycerol ester to form a free fatty acid is referred to as a lipase, which has such an advantage that it has high stability in an organic solvent, catalyzes an ester synthesis reaction with a high yield, and is available at low cost. Accordingly, a lipase is preferably used in the production method of the invention from the standpoint of yield and cost.

A lipase of various origins may be used, and preferred examples thereof include a lipase obtained from a microorganism, such as those belonging to the genera *Pseudomonas, Alcaligenes, Achromobacter, Candida, Aspergillus, Rhizopus* and *Mucor*, a lipase obtained from vegetable seeds, a lipase obtained from an animal tissues, and pancreatin and steapsin. Among these, a lipase obtained from a microorganism belonging to the genera *Pseudomonas, Candida* and *Aspergillus* is preferably used.

The polycondensation catalysts may be used solely or in combination of plural kinds thereof. The catalyst may be recovered and reused depending on necessity.

Various methods may be used for obtaining the colored resin particle dispersion liquid of the invention with variation of the addition timing of the colorant.

In one method, the modified polyester resin as the dispersion resin is produced, and then it is mixed with the colorant and dispersed as particles. In this case, the polycondensation monomer or an alternate thereof, such as an oligomer or a polymer thereof, is dissolved or dispersed in a nonaqueous solvent, and then heated and stirred along with the polycondensation catalyst at a temperature of 150° C. or less, followed by maintaining at ordinary pressure or reduced pressure, to proceed the reaction. In order to obtain polyester having a higher molecular weight, depending on necessity, furthermore, water or an excessive amount of the polycondensation monomer is distilled out to the exterior of the reaction system to obtain an unsaturated polyester polymer. The ethylenic unsaturated monomer is then radical-polymerized thereto, and the resulting polymer is mixed and dispersed with the colorant, such as a pigment, with a homogenizer or the like to produce the colored resin particle dispersion liquid. At this time, another polycondensation catalyst or a surfactant may be used in combination depending on necessity.

In another method, the colorant is made present with the polycondensation monomer or the ethylenic unsaturated monomer in the step of polycondensation of the unsaturated polyester or the step of vinyl modification thereof to form a graft polymer.

In the case where polyester is formed by polycondensation reaction in a nonaqueous solvent, the viscosity of the resulting polycondensation resin can be effectively reduced to proceed the polycondensation reaction in a favorable state, whereby polyester having a higher molecular weight can be obtained. In other words, a nonaqueous solvent is such a solvent that is effective for proceeding the polycondensation reaction at a low temperature of 150° C. or less.

Representative examples of synthesis of polyester include direct polycondensation, and polycondensation is generally carried out through an esterification or ester exchange reaction. The production method of polyester that can be applied to the invention may be carried out in an inert gas (such as dry nitrogen and argon) atmosphere and may be carried out by replacing the atmosphere with an inert gas or by blowing an inert gas therein, to prevent water from invading from the exterior.

The direct polycondensation is a dehydration reaction, and thus it is basically preferred for proceeding the reaction that the reaction is carried out at a high temperature. In order to proceed the reaction at a low temperature, it is necessary that an environment that is hydrophobic as much as possible is produced in a reaction field where the polycondensation monomer is present, and such a mechanism is provided that water is effectively eliminated from the reaction field.

Furthermore, the end group concentration is considerably decreased with increase of the molecular weight of the polyester during polymerization, and combined with decomposition reaction due to heat on ester exchange, the increase of the molecular weight reaches limit. In order to suppress the increase of the viscosity due to increase of the molecular weight to react the end groups with each other effectively at a low temperature, it is preferred to use such a medium that suppresses the viscosity from being increased upon mixing with the polycondensation monomer or an alternate thereof, such as an oligomer or a polymer thereof. Furthermore, in order to eliminate water or an alcohol by-produced, the production may be carried out under reduced pressure.

From 30 to 90 parts by weight, and preferably from 50 to 90 parts by weight, of the unsaturated polyester resin thus produced is reacted with from 70 to 10 parts by weight, and preferably from 50 to 10 parts by weight, of the ethylenic unsaturated monomer (vinyl monomer) to obtain a graft polymer. The control of the dispersion of the colorant can be facilitated by employing the aforementioned weight ratio.

The ethylenic unsaturated monomer (vinyl monomer) will be described below.

A part of the ethylenic unsaturated monomer preferably contains at least one monomer selected from the group consisting of a monomer having an aromatic ring, a monomer having an acidic group and a monomer having a basic group.

The acidic group of the monomer having an acidic group is not particularly limited. Examples of the acidic group include a carboxyl group, a sulfonic acid group and a phosphonic acid group, and a carboxyl group having a weak acid strength is preferred since aggregation of the dispersion liquid composition can be prevented from occurring.

The acid value of the modified polyester having an acidic group is preferably in a range of from 10 to 200 mgKOH/g, and more preferably in a range of from 10 to 150 mgKOH/g. In the case where the acid value is in the range, a sufficient zeta potential is obtained to improve the stability of the dispersion liquid, which provides a favorable image upon using as a toner.

The basic group of the monomer having a basic group is not particularly limited. Examples of the basic group include a primary, secondary, tertiary or quaternary amino group, and a tertiary amino group is preferred from the standpoint facility in ionization.

The amine value of the modified polyester having a basic group is preferably in a range of from 10 to 200 mgKOH/g, and more preferably in a range of from 10 to 150 mgKOH/g. In the case where the amine value is in the range, a sufficient zeta potential is obtained to improve the stability of the dispersion liquid, which provides a favorable image upon using as a liquid developer.

Examples of a vinyl monomer having an acidic group as a preferred component of the vinyl monomer include a monomer having a carboxyl group, such as acrylic acid, methacrylic acid, crotonic acid, ethacrynic acid, propylacrylic acid, isopropylacrylic acid, itaconic acid and fumaric acid, a monomer having a sulfonic acid group, such as ethyl acrylic acid 2-sulfonate, ethyl methacrylic acid 2-sulfonate and butylacrylamide sulfonic acid, and a monomer having a phosphonic group, such as ethyl methacrylic acid 2-phosphonate and ethyl acrylic acid 2-phosphonate, and among these, acrylic acid and methacrylic acid are preferred.

Examples of the vinyl monomer having a basic group include a monomer having a primary amino group, such as acrylic acid amide, aminoethyl acrylate, aminopropyl acrylate, methacrylic acid amide, aminoethyl methacrylate and aminopropyl methacrylate, a monomer having a secondary amino group, such as methylaminoethyl acrylate, methylaminopropyl acrylate, ethylaminoethyl acrylate, ethylaminopropyl acrylate, methylaminoethyl methacrylate, methylaminopropyl methacrylate, ethylaminoethyl methacrylate and ethylaminopropyl methacrylate, a monomer having a tertiary amino group, such as dimethylaminoethyl acrylate, diethylaminoethyl acrylate, dimethylaminopropyl acrylate, diethylaminopropyl acrylate, dimethylaminoethyl methacrylate, diethylaminoethyl methacrylate, dimethylaminopropyl methacrylate, and diethylaminopropyl methacrylate, and a monomer having a quaternary amino group, such as acrylic acid dimethylaminoethylmethyl chloride, methacrylic acid dimethylaminoethylmethyl chloride, acrylic acid dimethylaminoethylbenzyl chloride and methacrylic acid dimethylaminoethylbenzyl chloride.

The total amount of the vinyl monomer having an acidic group or a basic group is generally from 1 to 30% by weight, and preferably from 1 to 20% by weight, based on the total amount of the vinyl monomer. In the case where the amount of the vinyl monomer having an acidic group or a basic group is in the range, the pigment can be favorably dispersed, a suitable hydrophilic charging property is obtained, and a toner having good charging property is obtained.

Examples of the aromatic vinyl monomer as a preferred component of the vinyl monomer include styrene, α-methylstyrene, vinyltoluene and p-ethylstyrene. Examples of the other vinyl monomer include an alkyl methacrylate ester, such as methyl methacrylate butyl methacrylate, octyl methacrylate and stearyl methacrylate, an alkyl acrylate ester, such as ethyl acrylate, propyl acrylate, butyl acrylate and octyl acrylate, acrylonitrile and acrylamide.

The graft polymerization is carried out at a temperature of 150° C. or less, and preferably by solution polymerization. In the case of the solution polymerization, it is preferred that the vinyl monomer and a polymerization initiator are added to the unsaturated polyester having been dissolved in a hydrocarbon solvent, and they are polymerized in an inert gas atmosphere at a temperature of from 60 to 150° C., and more preferably from 70 to 100° C. Examples of the suitable polymerization initiator include an azo initiator, such as azobisisobutyronitrile azobisdimethylvaleronitrile.

The weight average molecular weight of the graft polymer is preferably from 1,500 to 40,000, and a chain transfer agent, such as dodecylmercaptan and thiophenol, may be used depending on necessity. In the case where the weight average molecular weight of the graft polymer is in the range, it has suitable viscoelasticity as a binder resin, and is good in durability, fixing property and leveling upon using as a toner.

The melt viscosity measured by the flow tester method of the graft polymer is preferably from $10^4$ to $10^6$ poise, and more preferably from $5 \times 10^3$ to $5 \times 10^6$ poise, at 100° C. In the case where the melt viscosity of the graft polymer is in the range, the antioffset property and the leveling of a toner layer upon using for transparency are improved, and transmitted light is not scattered to provide a transmission image with high chroma saturation.

In the colored resin particle dispersion liquid of the invention, a charge controlling agent of various kinds may be used, and representative examples thereof include a quaternary ammonium salt complex and a salicylic acid metal complex.

The number average particle diameter of the colored resin particles in the colored resin particle dispersion liquid is preferably from 0.05 to 1 μm. The number average particle diameter of the colored resin particles in the invention is preferably as small as possible as far as stable dispersion is obtained, and the number average particle diameter that is ordinarily obtained is 0.05 μm or more. In the case where the number average particle diameter is too large, the colored resin particles are liable to be precipitated to make an image unclear or to decrease an image density. In the case where the particle diameter is increased, furthermore, a high resolution cannot be obtained. The average particle diameter of the colored resin particles can be measured with a particle diameter measuring apparatus by light scattering or laser diffraction.

As the colorant in the invention, a pigment and/or a dye that are insoluble in the nonaqueous solvent used in the graft polymerization are used. These are not particularly limited, and various kinds of dyes and pigments having been known in the art may be used. Specific examples thereof include carbon black, an acetoacetic acid arylamide monoazo yellow pigment, such as C.I. Pigment Yellow 1, 3, 74, 97 and 98; an imidazolone monoazo yellow pigment, such as C.I. Pigment Yellow 181; an acetoacetic acid arylamide disazo yellow pigment, such as C.I. Pigment Yellow 12, 13, 14 and 17; a yellow pigment, such as C.I. Solvent Yellow 19, 77 and 79, and C.I. Disperse Yellow 164; a red or rouge pigment, such as C.I. Pigment Red 48, 49:1, 53:1, 57, 57:1, 81, 122, 5 and 146; a red dye, such as C.I. Solvent Red 49, 52, 58 and 8; a blue dye or pigment of copper phthalocyanine or a derivative thereof, such as C.I. Pigment Blue 15:3 and 15:4; and a green pigment, such as C.I. Pigment Green 7 and 36. These dyes and pigments may be used solely or as a mixture of two or more kinds thereof.

The toner of the liquid developer of the invention may contain a charge control agent depending on necessity, which may be one having been ordinarily used in a liquid developer for developing an electrostatic latent image. Examples thereof include cobalt naphthenate, copper naphthenate, copper oleate, cobalt oleate, zirconium octylate, cobalt octylate, sodium dodecylbenzenesulfonate, calcium dodecylbenzenesulfonate, soybean lecithin and aluminum octoate.

An auxiliary agent, such as wax, may be mixed therein, and one having been ordinarily used in a liquid developer for developing an electrostatic latent image may be used. Examples thereof include paraffin wax, polyethylene wax, polypropylene wax, an ethylene copolymer and a propylene copolymer.

The auxiliary agent, such as the charge controlling agent and the wax mentioned above, may be used by mixing with the binder resin before being attached with the colorant.

The dispersion medium that can be used in the colored resin particle dispersion liquid of the invention is preferably an organic solvent although water may be used. Examples of the organic solvent include an aliphatic hydrocarbon solvent, such as hexane and mineral spirit; a silicone oil, such as dialkylpolysiloxane and cyclic polydialkylsiloxane; a vegetable oil, such as olive oil, safflower oil, sunflower oil, soybean oil and linseed oil; aromatic hydrocarbon, such as benzene, toluene and xylene; an ester solvent, such as butyl acetate; an alcohol solvent, such as methanol and butanol; a ketone solvent, such as methyl ethyl ketone and isobutyl methyl ketone; and a non-protonic polar solvent, such as dimethylformamide, dimethylsulfoxide, N-methylpyrrolidone and pyridine, which may be used in combination. The organic solvent is preferably a non-reactive organic solvent that is not miscible with water.

Examples of the non-reactive organic solvent include an aliphatic hydrocarbon solvent, such as hexane and mineral spirit; an aromatic hydrocarbon, such as benzene, toluene and xylene; an ester solvent, such as butyl acetate; an alcohol solvent, such as methanol and butanol; a ketone solvent, such as methyl ethyl ketone and isobutyl methyl ketone; and a non-protonic polar solvent, such as dimethylformamide, dimethylsulfoxide, N-methylpyrrolidone and pyridine, which may be used in combination. Among these solvents, an aliphatic hydrocarbon solvent and an aromatic hydrocarbon solvent are preferred from the standpoint of dehydration in the esterification reaction.

(Nonaqueous Dispersion Medium)

The nonaqueous dispersion medium in the liquid developer of the invention is not particularly limited as far as it is one having been ordinarily used as a dispersion medium of a liquid developer, and in general, one having a volume resistivity of $10^{10}$ Ω·cm or more is used, and one having a dielectric constant of 3.5 or more is used. Examples of the nonaqueous dispersion medium include an aliphatic hydrocarbon, an alicyclic hydrocarbon, an aromatic hydrocarbon, a halogenated hydrocarbon and a polysiloxane, and a isoparaffin petroleum solvent is preferably used from the standpoint of volatility, safety, toxicity and odor. Examples of the isoparaffin petroleum solvent include Isopar M, Isopar G, Isopar H, Isopar L and Isopar K (all produced by Exxon Chemical Corp.) and Shellsol 71 (produced by Shell Oil Co.).

(Production Method of Liquid Developer)

The colored resin particle dispersion liquid produced according to the production method of the invention can be applied directly to the production of the developer for developing an electrostatic latent image (which may be simply referred to as a liquid developer in the invention). The liquid developer herein is a developer for developing an electrostatic latent image that is in a liquid state upon applying to the developing process. A liquid developer that is in a solid state at ordinary temperature but is in a liquid state by heating upon applying to the developing process is also included.

The colored resin particle dispersion liquid can also be obtained by dispersing the modified polyester and the colorant in a dispersing apparatus, such as a bead mill, e.g., a Dinor mill and a DSP mill, a roll mill, a sand mill, an attritor, a kneader, and a high pressure jet mill, e.g., a nanomizer. Furthermore, various kinds of additives, such as a surfactant, a pigment dispersant, a pigment derivative and a charge generating agent, may be added.

As the dispersion conditions upon dispersing with a dispersing apparatus, the temperature is preferably in a range of from 0 to 150° C. from the standpoint of economy, and the dispersion time is preferably as short as possible and is preferably from 0.1 to 10 hr/kg from the standpoint of productivity.

The solvent may be concentrated depending on necessity. Examples of the concentrating method include an ordinary distillation method under ordinary pressure or reduced pressure. Furthermore, the entire solvent may be distilled out or replaced with water, or dried, to apply to a powdered paint, a toner and plastics.

The purpose of the colored resin particle dispersion of the invention is not particularly limited, and examples thereof include a coating composition for automobiles, buildings and PCM, a printing ink, such as a gravure ink, an ink for an ink-jet printer, and a wet toner for a wet electrophotograpic printer and an ink-jet printer utilizing electrostatic force (as described, for example, in JP-A-8-291267, Japanese Patent No. 2,735,030, and High Density Ink-jet Recording in JHC98 Fall Meeting). Among these, it is excellent in stability upon use for a long period in the field of a wet toner. Upon using the dispersion liquid of the invention in these purposes, a binder, an organic solvent and various kinds of additives may be added thereto to adjust the particle concentration and the binder concentration. An ordinary additive, such as a leveling agent and a charge controlling agent, such as a metallic soap and lecithin, may be used, but the invention is not limited to these compounds. The binder, the organic solvent and the various additives are added to the dispersion liquid of the invention to prepare finally a coating composition, a printing ink and a wet toner.

EXAMPLE

The invention will be described with reference to the following examples, but the invention is not construed as being limited to the examples. All the "parts" in the examples are "parts by weight" unless otherwise indicated.
(Measurement of Melting Point and Glass Transition Point)

The melting point is measured according to the differential scanning calorimetry (DSC), i.e., the melting point is obtained from the base line and the endothermic peak upon heating a specimen at a constant temperature increasing rate by using DSC-20 (produced by Seiko Instruments Inc.)
(Measurement of Weight Average Molecular Weight Mw and Number Average Molecular Weight Mn)

The values of the weight average molecular weight Mw and the number average molecular weight Mn are measured by gel permeation chromatography (GPC) under the following conditions. A solvent (tetrahydrofuran) is flowed at a flow rate of 1.2 mL/min at a temperature of 40° C. 3 mg of a specimen in the form of a tetrahydrofuran solution having a concentration of 0.2 g per 20 mL is injected for measurement. In the measurement of the molecular weight of the specimen, such measurement conditions are selected that the molecular weight of the specimen is encompassed in the range where a linear relationship is obtained between the logarithm of the calibration curve obtained with a monodisperse polystyrene standard sample containing plural kinds of molecular weight and the count number.

The reliability in measurement can be confirmed in such a manner that the NBS706 polystyrene standard sample exhibits the following molecular weight under the aforementioned conditions.

Weight average molecular weight Mw: $28.8 \times 10^4$
Number average molecular weight Mn: $13.7 \times 10^4$ The GPC columns used are TSK-GEL and GMH (produced by Tosoh Corp.).

The solvent and the measurement temperature are appropriately changed depending on specimens to be measured.

In the case where the resin particle dispersion liquid is produced by using aliphatic polyester as the polyester and a vinyl monomer containing an aromatic group as the addition polymerization resin, the molecular weights thereof may be measured by attaching a device for separating UV and RI as a detector upon measuring the molecular weights with GPC.

Resin Synthesis Example 1

| | |
|---|---|
| Bisphenol A 2-mol EO adduct | 64 parts by weight |
| Maleic anhydride | 1.2 parts by weight |
| Isophthalic acid | 16 parts by weight |
| 1,4-Cyclohexanedicarboxylic acid | 16 parts by weight |
| Dodecylbenzenesulfonic acid | 2.5 parts by weight |
| Isopar M (Exxon Chemical Corp.) | 250 parts by weight |

The term EO herein is an abbreviation of ethylene oxide, and PO appearing later is an abbreviation of propylene oxide.

The components are heated under stirring with water distilling out to the exterior of the system in a nitrogen stream at 90° C. and 1 atm for 5 hours and further at 130° C. and 500 mmHg for 2 hours, to obtain an oligomer of the polyester-forming monomer. 300 parts by weight of Isopar H300 is added to the system, to which a condenser tube is attached, and Isopar H distilled out is returned to the reactor. Thereafter, the reaction is carried out at 128° C. and 450 mmHg for 10 hours to obtain a viscous liquid (liquid containing a polycondensation resin 1). A part of the resulting polyester is dried in air for analysis, and Isopar M is sufficiently removed by drying with hot air at 60° C. for analysis. The weight average molecular weight thereof is 12,000. The differential calorimetry of the polyester reveals that the glass transition point Tg (onset) is 58.9° C. The liquid containing a polycondensation resin 1 is then concentrated to obtain a resin solid content of 30% by weight.

| | |
|---|---|
| Liquid containing polycondensation resin 1 | 167 parts by weight (50 parts by weight of resin) |
| Styrene | 13 parts by weight |
| Methacrylic acid | 1.0 part by weight |
| Cyan pigment (C.I. Pigment Blue 4933M) | 8.9 parts by weight |
| Xylene | 50 parts by weight |

The components are placed in a reactor having a stirrer, and the temperature is increased until xylene is refluxed. 0.4 part by weight of azobisisobutyronitrile is added dropwise in a nitrogen atmosphere over about 30 minutes. After completing the dropwise addition, the temperature is maintained for 3 hours, and then xylene is distilled out to take out a resin. The vinyl-modified polyester resin thus produced is referred to as a resin A. The resin A has a weight average molecular weight of 14,000, a melt viscosity at 100° C. of $5 \times 10^4$ poise and a glass transition temperature of 62° C. The melt viscosity is measure with a flow tester, Model CFT-500, produced by Shimadzu Corp., under the conditions of a nozzle diameter of 1 mm, a nozzle length of 1 mm, a load of 30 kg and a temperature increasing rate of 3° C. per minute.

Resin Synthesis Example 2

| | |
|---|---|
| Bisphenol A 2-mol EO adduct | 30 parts by weight |
| Bisphenol A 2-mol Po adduct | 35 parts by weight |
| Fumaric acid | 1.5 parts by weight |
| Isophthalic acid | 16 parts by weight |
| Phenylenediacetic acid | 16 parts by weight |
| p-Toluenesulfonic acid | 1.2 parts by weight |
| Xylene | 250 parts by weight |

The components are heated under stirring with water distilling out to the exterior of the system in a nitrogen stream at 90° C. and 1 atm for 5 hours and further at 120° C. and 500 mmHg for 2 hours, to obtain an oligomer of the polyester-forming monomer. 300 parts by weight of xylene is added to the system, to which a condenser tube is attached, and xylene distilled out is returned to the reactor. Thereafter, the reaction is carried out at 128° C. and 450 mmHg for 10 hours to obtain a viscous liquid (liquid containing a polycondensation resin 2). A part of the resulting polyester is dried in air for analysis, and xylene is sufficiently removed by drying with hot air at 60° C. for analysis. The weight average molecular weight thereof is 14,000. The differential calorimetry of the polyester reveals that the glass transition point Tg (onset) is 55.0° C.

The liquid containing a polycondensation resin 2 is then concentrated to obtain a resin solid content of 30% by weight.

| | |
|---|---|
| Liquid containing polycondensation resin 2 | 167 parts by weight (50 parts by weight of resin) |
| Styrene | 13 parts by weight |
| Diethylaminoethyl methacrylate | 1.0 part by weight |
| Magenta pigment (C.I. Pigment Red 57:1) | 8.9 parts by weight |
| Xylene | 50 parts by weight |

The components are placed in a reactor having a stirrer, and the temperature is increased until xylene is refluxed. 0.4 part by weight of azobisisobutyronitrile is added dropwise in a nitrogen atmosphere over about 30 minutes. After completing the dropwise addition, the temperature is maintained for 3 hours, and then xylene is distilled out to take out a resin. The vinyl-modified polyester resin thus produced is referred to as a resin B. The resin B has a weight average molecular weight of 16,000, a melt viscosity at 100° C. of $8 \times 10^4$ poise and a glass transition temperature of 60° C.

Resin Synthesis Example 3

| | |
|---|---|
| 1,9-Nonanediol | 21 parts by weight |
| Cyclohexanedimethanol | 31 parts by weight |
| Maleic anhydride | 1.2 parts by weight |
| Isophthalic acid | 16 parts by weight |
| 1,4-cyclohexanedicarboxylic acid | 16 parts by weight |
| Benzenesulfonic acid | 2.5 parts by weight |
| Isopar H (Exxon Chemical Corp.) | 250 parts by weight |

The components are heated under stirring with water distilling out to the exterior of the system in a nitrogen stream at 90° C. and 1 atm for 6 hours and further at 135° C. and 500 mmHg for 2 hours, to obtain an oligomer of the polyester-forming monomer. 300 parts by weight of Isopar H is added to the system, to which a condenser tube is attached, and Isopar H distilled out is returned to the reactor. Thereafter, the reaction is carried out at 128° C. and 450 mmHg for 10 hours to obtain a viscous liquid (liquid containing a polycondensation resin 3). A part of the resulting polyester is dried in air for analysis, and Isopar H is sufficiently removed by drying with hot air at 60° C. for analysis. The weight average molecular weight thereof is 15,000. The differential calorimetry of the polyester reveals that the glass transition point Tg (onset) is 52.0° C. The liquid containing a polycondensation resin 3 is then concentrated to obtain a resin solid content of 30% by weight.

| | |
|---|---|
| Liquid containing polycondensation resin 3 | 167 parts by weight (50 parts by weight of resin) |
| Styrene | 13 parts by weight |
| Methacrylic acid | 1.0 part by weight |
| Basic carbon black (Regal 330, produced by Cabot Oil & Gas Corp.) | 10.5 parts by weight |
| Xylene | 50 parts by weight |

The components are placed in a reactor having a stirrer, and the temperature is increased until xylene is refluxed. 0.4 part by weight of azobisisobutyronitrile is added dropwise in a nitrogen atmosphere over about 30 minutes. After completing the 4 dropwise addition, the temperature is maintained for 3 hours, and then xylene is distilled out to take out a resin. The vinyl-modified polyester resin thus produced is referred to as a resin C. The resin C has a weight average molecular weight of 17,000, a melt viscosity at 100° C. of $9 \times 10^3$ poise and a glass transition temperature of 51° C.

Resin Synthesis Example 4

Comparison

| | |
|---|---|
| Bisphenol A 2-mol EO adduct | 64 parts by weight |
| Terephthalic acid | 16 parts by weight |
| Sebacic acid | 16 parts by weight |
| Dibutyltin oxide | 2.5 parts by weight |
| Toluene | 250 parts by weight |

The components are heated under stirring with water distilling out to the exterior of the system in a nitrogen stream at 90° C. and 1 atm for 5 hours and further at 130° C. and 500 mmHg for 2 hours, to obtain an oligomer. 300 parts by weight of toluene is added to the system, to which a condenser tube is attached, and toluene distilled out is returned to the reactor. Thereafter, the reaction is carried out at 128° C. and 450 mmHg for 10 hours to obtain a viscous liquid (liquid containing a polycondensation resin 4). A part of the resulting polyester is dried in air for analysis, and toluene is sufficiently removed by drying with hot air at 60° C. for analysis. The weight average molecular weight thereof is 3,800. The differential calorimetry of the polyester reveals that the glass transition point Tg (onset) is 35.1° C. The liquid containing a polycondensation resin 4 is then concentrated to obtain a resin solid content of 30% by weight.

| | |
|---|---|
| Liquid containing polycondensation resin 4 | 167 parts by weight (50 parts by weight of resin) |
| styrene | 13 parts by weight |
| Methacrylic acid | 1.0 part by weight |
| Cyan pigment (C.I. Pigment Blue 4933M) | 8.9 parts by weight |
| Xylene | 50 parts by weight |

The components are placed in a reactor having a stirrer, and the temperature is increased until xylene is refluxed. 0.4 part by weight of azobisisobutyronitrile is added dropwise in a nitrogen atmosphere over about 30 minutes. After completing the dropwise addition, the temperature is maintained for 3 hours, and then xylene is distilled out to take out a resin. The vinyl-polyester mixed resin thus produced is referred to as a resin D. The resin D has a weight average molecular weight of 4,100, a melt viscosity at 100° C. of $7 \times 10^2$ poise and a glass transition temperature of 36° C.

Example 1

As a nonaqueous pigment dispersion liquid, the resin A is concentrated to a pigment solid content of 30% by weight. The following components are weighed in a 100 cc-plastic bottle.

| | |
|---|---|
| Resin A | 120 parts by weight (3.6 parts by weight of resin) |

-continued

| | |
|---|---|
| Solsperse 5000 (copper phthalocyanine pigment derivative, produced by Zeneca Agrochemicals, Co., Ltd.) | 0.2 part by weight |
| Cobalt naphthenate | 0.2 part by weight |
| Isopar G | 8.2 parts by weight |

The components are dispersed with 100 parts by weight of 3-mm zirconia beads in a paint shaker (produced by Eishin Co., Ltd.) for 2 hours, and the following components are added thereto to obtain a dispersed slurry.

| | |
|---|---|
| Methyl ethyl ketone | 6.0 parts by weight |
| Isopar G | 24.0 parts by weight |

64.9 parts by weight of the dispersion liquid composition and 35.1 parts by weight of Isopar G are mixed to obtain a liquid developer having a pigment content of 4.1%.

The liquid developer has a dispersed particle diameter of 171 nm (measured with a particle size distribution measuring apparatus of laser Doppler system, Model N4PLUS, produced by Beckman Coulter, Inc.) and a zeta potential of 22.4 mV (measured with LAZER ZEE METER Model 501, produced by Pen Kem Inc.). The dispersion liquid is subjected to a storage test in a thermostatic bath at 60° C. for 14 days. After the test, the dispersed particle diameter is 168 nm without aggregation, and the zeta potential is 21.6 mV suffering substantially no change, which reveal excellent storage stability.

Example 2

As a nonaqueous pigment dispersion liquid, the resin B is concentrated to a pigment solid content of 30% by weight. The following components are weighed in a 100 cc-plastic bottle.

| | |
|---|---|
| Resin B | 120 parts by weight (3.6 parts by weight of resin) |
| Solsperse 13940 (produced by Zeneca Agrochemicals, Co., Ltd.) | 0.2 part by weight |
| Aluminum stearate | 0.2 part by weight |
| Isopar G | 8.2 parts by weight |

The components are dispersed with 100 parts by weight of 3-mm zirconia beads in a paint shaker (produced by Eishin Co., Ltd.) for 2 hours, and the following components are added thereto to obtain a dispersed slurry.

| | |
|---|---|
| Methyl ethyl ketone | 6.0 parts by weight |
| Isopar G | 24.0 parts by weight |

61.8 parts by weight of the dispersion liquid composition and 29.4 parts by weight of Isopar G are mixed to obtain a liquid developer having a pigment content of 4.5%.

The liquid developer has a dispersed particle diameter of 250 nm (measured with a particle size distribution measuring apparatus of laser Doppler system, Model N4PLUS, produced by Beckman Coulter, Inc.) and a zeta potential of −18.4 mv (measured with LAZER ZEE METER Model 501, produced by Pen Kem Inc.). The dispersion liquid is subjected to a storage test in a thermostatic bath at 60° C. for 14 days. After the test, the dispersed particle diameter is 258 nm without aggregation, and the zeta potential is −19.6 mV suffering substantially no change, which reveal excellent storage stability.

Example 3

As a nonaqueous pigment dispersion liquid, the resin C is concentrated to a pigment solid content of 30% by weight. The following components are weighed in a 100 cc-plastic bottle.

| | |
|---|---|
| Resin C | 120 parts by weight (3.6 parts by weight of resin) |
| Solsperse 13940 (produced by Zeneca Agrochemicals, Co., Ltd.) | 0.2 part by weight |
| Lecithin (soybean) | 0.2 part by weight |
| Isopar G | 8.2 parts by weight |

The components are dispersed with 100 parts by weight of 3-mm zirconia beads in a paint shaker (produced by Eishin Co., Ltd.) for 2 hours, and the following components are added thereto to obtain a dispersed slurry.

| | |
|---|---|
| Methyl ethyl ketone | 6.0 parts by weight |
| Isopar G | 24.0 parts by weight |

59.8 parts by weight of the dispersion liquid composition and 25.9 parts by weight of Isopar G are mixed to obtain a liquid developer having a pigment content of 5.5%.

The liquid developer has a dispersed particle diameter of 199 nm (measured with a particle size distribution measuring apparatus of laser Doppler system, Model N4PLUS, produced by Beckman Coulter, Inc.) and a zeta potential of −25.9 mV (measured with LAZER ZEE METER Model 501, produced by Pen Kem Inc.). The dispersion liquid is subjected to a storage test in a thermostatic bath at 60° C. for 14 days. After the test, the dispersed particle diameter is 202 nm without aggregation, and the zeta potential is −26.0 mV suffering substantially no change, which reveal excellent storage stability.

Example 4

As a nonaqueous pigment dispersion liquid, the resin C is concentrated to a pigment solid content of 30% by weight. The following components are weighed in a 100 cc-plastic bottle.

| | |
|---|---|
| Resin C | 120 parts by weight (3.6 parts by weight of resin) |
| Solsperse 13940 (produced by Zeneca Agrochemicals, Co., Ltd.) | 0.2 part by weight |
| Isopar G | 8.2 parts by weight |

The components are dispersed with 100 parts by weight of 3-mm zirconia beads in a paint shaker (produced by Eishin Co., Ltd.) for 2 hours, and the following components are added thereto to obtain a dispersed slurry.

| | |
|---|---|
| Methyl ethyl ketone | 6.0 parts by weight |
| Isopar G | 24.0 parts by weight |

59.8 parts by weight of the dispersion liquid composition and 25.9 parts by weight of Isopar G are mixed to obtain an ink for ink-jet recording having a pigment content of 3.5%.

The ink has a dispersed particle diameter of 145 nm (measured with a particle size distribution measuring apparatus of laser Doppler system, Model N4PLUS, produced by Beckman Coulter, Inc.) and a zeta potential of 15.9 mV (measured with LAZER ZEE METER Model 501, produced by Pen Kem Inc.). The dispersion liquid is subjected to a storage test in a thermostatic bath at 60° C. for 14 days. After the test, the dispersed particle diameter is 151 nm without aggregation, and the zeta potential is 16.9 mV suffering substantially no change, which reveal excellent storage stability.

Example 5

As a nonaqueous pigment dispersion liquid, the resin A is concentrated to a pigment solid content of 30% by weight. The following components are weighed in a 100 cc-plastic bottle.

| | |
|---|---|
| Resin A | 120 parts by weight |
| | (3.6 parts by weight of resin) |
| Solsperse 13940 | 0.2 part by weight |
| (produced by Zeneca Agrochemicals, Co., Ltd.) | |
| Isopar G | 8.2 parts by weight |

The components are dispersed with 100 parts by weight of 3-mm zirconia beads in a paint shaker (produced by Eishin Co., Ltd.) for 2 hours, and the following components are added thereto to obtain a dispersed slurry.

| | |
|---|---|
| Methyl ethyl ketone | 6.0 parts by weight |
| Isopar G | 24.0 parts by weight |

59.8 parts by weight of the dispersion liquid composition and 25.9 parts by weight of Isopar G are mixed to obtain an ink for ink-jet recording having a pigment content of 3.0%.

The ink has a dispersed particle diameter of 198 nm (measured with a particle size distribution measuring apparatus of laser Doppler system, Model N4LUS, produced by Beckman Coulter, Inc.) and a zeta potential of −12.9 mV (measured with LAZER ZEE METER Model 501, produced by Pen Kem Inc.). The dispersion liquid is subjected to a storage test in a thermostatic bath at 60° C. for 14 days. After the test, the dispersed particle diameter is 201 nm without aggregation, and the zeta potential is −13.9 mV suffering substantially no change, which reveal excellent storage stability.

Comparative Example 1

As a nonaqueous pigment dispersion liquid, the resin D is concentrated to a pigment solid content of 30% by weight. The following components are weighed in a 100 cc-plastic bottle.

| | |
|---|---|
| Resin D | 120 parts by weight |
| | (3.6 parts by weight of resin) |
| Solsperse 13940 | 0.2 part by weight |
| (produced by Zeneca Agrochemicals, Co., Ltd.) | |
| Aluminum stearate | 0.2 part by weight |
| Isopar G | 8.2 parts by weight |

The components are dispersed with 100 parts by weight of 3-mm zirconia beads in a paint shaker (produced by Eishin Co., Ltd.) for 2 hours, and the following components are added thereto to obtain a dispersed slurry.

| | |
|---|---|
| Methyl ethyl ketone | 6.0 parts by weight |
| Isopar G | 24.0 parts by weight |

59.8 parts by weight of the dispersion liquid composition and 25.9 parts by weight of Isopar G are mixed to obtain a liquid developer having a pigment content of 6.5%.

The liquid developer has a dispersed particle diameter of 3,580 nm (measured with a particle size distribution measuring apparatus of laser Doppler system, Model N4PLUS, produced by Beckman Coulter, Inc.) and a zeta potential of substantially zero (measured with LAZER ZEE METER Model 501, produced by Pen Kem Inc.). The dispersion liquid is subjected to a storage test in a thermostatic bath at 60° C. for 14 days. After the test, the dispersed particle diameter is 4,500 nm with precipitation, and the zeta potential is substantially zero.

Comparative Example 2

As a nonaqueous pigment dispersion liquid, the resin D is concentrated to a pigment solid content of 30% by weight. The following components are weighed in a 100 cc-plastic bottle.

| | |
|---|---|
| Resin D | 120 parts by weight |
| | (3.6 parts by weight of resin) |
| Solsperse 13940 | 0.2 part by weight |
| (produced by Zeneca Agrochemicals, Co., Ltd.) | |
| Isopar G | 8.2 parts by weight |

The components are dispersed with 100 parts by weight of 3-mm zirconia beads in a paint shaker (produced by Eishin Co., Ltd.) for 2 hours, and the following components are added thereto to obtain a dispersed slurry.

| | |
|---|---|
| Methyl ethyl ketone | 6.0 parts by weight |
| Isopar G | 24.0 parts by weight |

35.9 parts by weight of the dispersion liquid composition and 48.9 parts by weight of Isopar G are mixed to obtain an ink for ink-jet recording having a pigment content of 2.8%.

The liquid developer has a dispersed particle diameter of 2,800 nm (measured with a particle size distribution measuring apparatus of laser Doppler system, Model N4PLUS, produced by Beckman Coulter, Inc.) and a zeta potential of substantially zero (measured with LAZER ZEE METER Model 501, produced by Pen Kem Inc.). The dispersion liquid is subjected to a storage test in a thermostatic bath at 60° C. for 14 days. After the test, the dispersed particle diameter is 3,500 nm with precipitation, and the zeta potential is substantially zero.

Example 6

The dispersion liquid composition produced in Example 1 is diluted with isopropyl alcohol to confirm application to a polar solvent. As a result, the dispersed particle diameter is 172 nm without aggregation, and the dispersion liquid composition can be applied, for example, to a printing ink or a coating composition using isopropyl alcohol.

Comparative Example 3

The dispersion liquid composition produced in Comparative Example 2 is diluted with isopropyl alcohol to confirm application to a polar solvent. As a result, the dispersed particle diameter is 15,670 nm with precipitation, and the dispersion liquid composition cannot be applied, for example, to a printing ink or a coating composition using isopropyl alcohol.

graft-polymerizing a vinyl monomer mixture comprising (a) an aromatic vinyl monomer and (b) a vinyl monomer containing an acidic group, to the unsaturated polyester in the nonaqueous solvent to produce a modified polyester resin; and dispersing a colorant and the modified polyester resin to produce the colored resin particle dispersion liquid, the polycondensing and the graft-polymerizing being carried out at a temperature of about 150° C. or less, wherein a content of the vinyl monomer mixture is 0.1 to 20.0% by weight based on the unsaturated polyester, and the colored resin particles have a number average particle size of from about 0.05 to 1.0 μm.

2. The method for producing a colored resin particle dispersion liquid as claimed in claim 1,
wherein the polyester-forming monomers comprise a monomer that provides a number of an aromatic ring and/or an alicyclic ring per repeating unit of 2 or more in the unsaturated polyester, and the polyester-forming monomer is polycondensed with a polycondensation catalyst in the nonaqueous solvent.

TABLE 1

|  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Purpose | liquid developer | liquid developer | liquid developer | oily ink-jet | oily ink-jet | IPA dilution | liquid developer | oily ink-jet | IPA dilution |
| Nonaqueous colored resin | A | B | C | C | A | A | D | D | D |
| Tg (° C.) | 62 | 60 | 52 | 52 | 62 | 62 | 36 | 36 | 36 |
| Mw | 14,000 | 16,000 | 17,000 | 17,000 | 14,000 | 14,000 | 4,100 | 4,100 | 4,100 |
| Viscosity at 100° C. (poise) | $5 \times 10^4$ | $8 \times 10^4$ | $9 \times 10^3$ | $9 \times 10^3$ | $5 \times 10^4$ | $5 \times 10^4$ | $7 \times 10^2$ | $7 \times 10^2$ | $7 \times 10^2$ |
| Initial performance | | | | | | | | | |
| Particle diameter (nm) | 171 | 250 | 199 | 145 | 198 | 172 | 3,580 | 2,800 | 15,670 |
| Zeta potential (mV) | 22.4 | −18.4 | −25.9 | 15.9 | −12.9 | — | 0 | 0 | — |
| Performance after storing at 60° C. for 14 days | | | | | | | | | |
| Particle diameter (nm) | 168 | 258 | 202 | 151 | 201 | — | 4,500 | 3,500 | — |
| Zeta potential (mV) | 21.6 | −19.6 | −26.0 | 16.9 | −13.9 | — | 0 | 0 | — |

According to the invention, a polyester resin may be polymerized at a relatively low temperature, whereby a colored resin particle dispersion liquid may be produced with a small amount of energy. Furthermore, a colored resin particle dispersion liquid having high storage stability capable of dispersing stably colored resin fine particles for a prolonged period of time. Various kinds of colorants may be used in the invention for dispersing colored resin fine particles, and thus the degree of freedom in selection of the colorant is increased. The invention improves storage stability of a liquid developer, an ink composition for inkjet recording and the like.

What is claimed is:

1. A method for producing a colored resin particle dispersion liquid comprising:
   polycondensing polyester-forming monomers in a nonaqueous solvent to produce an unsaturated polyester;

3. The method for producing a colored resin particle dispersion liquid as claimed in claim 1,
wherein the vinyl monomer mixture comprises about 50% by weight or more of the aromatic vinyl monomer and about 30% by weight or less of the vinyl monomer containing an acidic group.

4. The method for producing a colored resin particle dispersion liquid as claimed in claim 1,
wherein the colorant is selected from the group consisting of a pigment, a dye and an oil soluble dye.

5. The method for producing a colored resin particle dispersion liquid claimed in claim 1,
wherein the polyester-forming monomers are polycondensed with a catalyst comprising at least one of a Brønsted acid and a surfactant type Brønsted acid.

6. The method for producing a colored resin particle dispersion liquid as claimed in claim 1, wherein the polyester-forming monomers comprise an unsaturated polycarboxylic acid in the amount of from about 0.1 to 5% by weight.

7. The method for producing a colored resin particle dispersion liquid as claimed in claim 4,
wherein the unsaturated polycarboxylic acid is an ethylenic unsaturated polycarboxylic acid.

8. A colored resin particle dispersion liquid produced by the method as claimed in claim 1, wherein
the modified polyester resin has a weight average molecular weight of from about 1,500 to 40,000.

9. The colored resin particle dispersion liquid as claimed in claim 6,
wherein the modified polyester resin has a melt viscosity at 100° C. of from about $10^3$ to $10^6$ poise.

10. The colored resin particle dispersion liquid as claimed in claim 6,
wherein the modified polyester resin has an acid value of from about 10 to 200 mgKOH/g.

11. An electrophotographic liquid developer comprising the colored resin particle dispersion liquid as claimed in claim 6.

12. An ink composition comprising the colored resin particle dispersion liquid as claimed in claim 6.

13. The method for producing a colored resin particle dispersion liquid as claimed in claim 1,
wherein the graft-polymerizing comprises graft-polymerizing from about 70 to about 10 parts by weight of the vinyl monomer mixture to from about 30 to about 90 parts by weight of the unsaturated polyester.

14. The method for producing a colored resin particle dispersion liquid as claimed in claim 1,
wherein the graft-polymerizing comprises graft-polymerizing from about 50 to about 10 parts by weight of the vinyl monomer mixture to from about 50 to about 90 parts by weight of the unsaturated polyester.

15. The method for producing a colored resin particle dispersion liquid as claimed in claim 1,
wherein the nonaqueous solvent includes an aliphatic hydrocarbon, an alicyclic hydrocarbon, an aromatic hydrocarbon, a halogenated hydrocarbon or a polysiloxane compound.

* * * * *